United States Patent Office 2,981,769
Patented Apr. 25, 1961

2,981,769

SELECTIVE HYDROGENATION OF ACETYLENE IN ETHYLENE

Ludo K. Frevel, Midland, and Leonard J. Kressley, Saginaw, Mich., assignors to The Dow Chemical Company, Midland, Mich., a corporation of Delaware No Drawing. Filed Sept. 17, 1959, Ser. No. 840,509

7 Claims. (Cl. 260—677)

This invention relates to selective hydrogenation of acetylene in the presence of ethylene. It pertains especially to an improvement in hydrogenation of a mixture comprising acetylene using a palladium catalyst whereby the hydrogenation of the ethylene is inhibited by the addition to the mixture of a substituted cyclohexane prior to contacting the mixture with the catalyst.

Ethylene is commonly produced by the pyrolysis of hydrocarbonaceous materials. Ethylene so produced usually contains at least a small proportion of acetylene. For many purposes for which ethylene is used, the presence of acetylene is undesirable and steps must be taken to remove it.

It is known that acetylene can be hydrogenated and procedures have been described for the selective hydrogenation of acetylene in an acetylene-ethylene mixture by the use of a palladium catalyst. Relatively good results in selective hydrogenation are obtained with a palladium catalyst, but substantial proportions of the acetylene may not be hydrogenated without either converting some of the acetylene to ethane or also hydrogenating a part of the initial ethylene in the mixture. While the amount of the acetylene and ethylene converted to ethane is decreased by the use of an improved palladium catalyst, such as described in the United States Letters Patent No. 2,802,889, issued to applicants of the instant application, it is desired to further enhance the hydrogenation of the acetylene so that the acetylene in the mixture can be substantially hydrogenated without the conversion of either the acetylene or the ethylene in the mixture to ethane.

It is among the objects of the present invention to provide an improved process for the selective hydrogenation of acetylene in a mixture containing acetylene and ethylene. A further object is to provide an improved process for the selective hydrogenation of acetylene employing a palladium catalyst whereby the hydrogenation of the acetylene is enhanced and the hydrogenation of the ethylene inhibited.

The above and other objects are attained according to the invention, by intermixing a substituted cyclohexane, such as dimethyl or diethyl cyclohexane, methylethylcyclohexane, and Decalin with the acetylene and ethylene mixture in proportions of from 50 to 2000 parts of the substituted cyclohxane per million parts of the acetylene and ethylene mixture prior to contacting the mixture with the palladium catalyst. The presence of the substituted cyclohexane in the mixture facilitates the hydrogenation of the acetylene to ethylene while inhibiting the hydrogenation of the ethylene. The substituted cyclohexane placed in the acetylene-ethylene mixture is not retained by the catalyst. Since the substituted cyclohydrocarbon added to the mixture is not retained by the catalyst, it does not have a permanent effect upon the catalyst.

The amount of the substituted cyclohexane intermixed with the acetylene-ethylene mixture very seldom exceeds 2000 parts by volume of the cyclohexane compound per million parts of the acetylene-ethylene mixture. While as little as 50 parts per million in the gas mixture markedly improves or enhances the hydrogenation of the acetylene, it is generally preferred to have from 100–500 parts per million of the substituted cyclohexane in the feed mixture.

The presence of the limited amount of the substituted cyclohexane not only improves the selectivity of the known palladium hydrogenation catalysts, but it furthers improves the selectivity of palladium catalysts to which other metals have been added to improve the catalyst's selectivity. For example, the selectivity of palladium catalyst which may consist of from 1 to 40 parts by weight per hundred parts of a metal, such as silver, copper, or gold, is further improved by the addition of the cyclohexane compound in the feed stream.

In practicing the present invention, a procedure similar to that used in contacting an acetylene and ethylene mixture with a palladium catalyst is used, except that a limited amount of the substituted cyclohexane is added prior to contacting the mixture with the catalyst. A gas stream of the ethylene, containing acetylene to be removed, is intermixed with a gas stream of hydrogen, unless an excess of hydrogen is already present in the ethylene-acetylene mixture, and from 100 to 500 parts by volume of the substituted cyclohexane per million parts of the mixture are added. The resulting mixture is passed into contact with the palladium catalyst whereby the acetylene is selectively hydrogenated to ethylene. The gas mixture may contain other materials, such as hydrocarbons, normally incident to the preparation of ethylene-containing gas, as well as nitrogen, carbon dioxide, and small portions of air and water vapor.

The proportion of hydrogen which should be present in, or be added to, the ethylene gas is at least that proportion necessary to hydrogenate all of the acetylene present in the mixture, i.e., 1 mole or more of hydrogen per mole of acetylene. A slight excess of hydrogen over that theoretically necessary to react with all the acetylene is usually required in the practical operation. Usually it is preferred to employ the minimum proportion of hydrogen that satisfactorily removes the acetylene from the treated gas product.

The temperature necessary in the reaction zone wherein the acetylene is hydrogenated depends largely on the activity of the palladium catalyst. Certain catalysts are active at room temperature, while other catalysts may require a reaction temperature of about 250° C. Generally, temperatures of from 60° to about 200° C. are preferred.

The pressure of the gas in the hydrogenation reaction zone does not appear to be critical and can be above or below atmospheric pressure.

The following example further illustrates the invention:

*Example*

A palladium catalyst containing 0.2 weight percent palladium and 0.002 weight percent silver prepared in a manner similar to that described in U.S. Patent No. 2,802,889, was used in the selective hydrogenation of a mixture containing acetylene and ethylene. The catalyst, in an amount of 15 milliliters, was placed in a glass reactor tube 10 centimeters long having an internal diameter of 1.2 centimeters and heated by a cylindrical electrical heater surrounding the tube.

A synthetic mixture of gases was made up from separate ingredients by metering separate streams of ethylene, acetylene, and hydrogen taken from storage cylinders through orifice meters under constant pressures maintained by constant-head bubbling column in each line. The acetylene stream was passed through a charcoal absorber to remove acetone and through a chromic acid scrubber to remove any phosphines or arsines. The three separated gas streams were brought together and mixed, and the resulting mixture was passed through a bed of basic lead acetate to remove any sulfides. In this manner a stream of ethylene containing 4 percent acetylene and 6 percent hydrogen, was obtained. This stream was passed over the 15 milliliters of the catalyst at a rate of 330 milliliters per minute while the catalyst was maintained at a temperature in the range of 140° to 150° C.

The product stream issuing from the reactor was analyzed by a mass spectrometer for ethane formation and by colorimetric means for acetylene.

In passing the stream free of the substituted cyclohexane through the catalyst bed, a product was obtained which contained approximately 2 volume percent of ethane and acetylene could be detected. Diethylcyclohexane was then intermixed with the ethylene stream in an amount of 130 parts of the substituted cyclohexane to a million parts of ethylene mixture. The ethane in the product decreased to 1.7 volume percent in 30 minutes and no acetylene could be detected. After operating in this manner for two hours, the addition of the substituted cyclohexane was discontinued. Upon discontinuing the addition of the diethylcyclohexane, acetylene could soon be detected in the product. Upon addition of diethylcyclohexane again, in an amount of 1300 parts per million parts of the ethylene mixture, the ethane in the product decreased to 0.6 volume percent in 30 minutes and no acetylene could be detected. The above run was repeated except that Decalin was used in place of diethylcyclohexane. Similar results to that above were obtained.

What is claimed is:

1. In a process for the selective hydrogenation of acetylene in a mixture containing ethylene and acetylene wherein the mixture with hydrogen in a proportion greater than 1 mole of hydrogen per mole of acetylene is contacted with a palladium catalyst, the improvement of enhancing the hydrogenation of the acetylene and inhibiting the hydrogenation of ethylene which comprises the step of intermixing the mixture with from 50 to 2000 parts by volume of a substituted cyclohexane selected from the group consisting of Decalin, dimethylcyclohexane, diethylcyclohexane and methylethylcyclohexane per million parts by volume of the mixture before contacting the mixture with the palladium catalyst.

2. A process according to claim 1 wherein the substituted cyclohexane is diethylcyclohexane and is intermixed with the mixture in amount of from 100 to 500 parts by volume of diethylcyclohexane per million parts by volume of the mixture.

3. A process for the selective hydrogenation of acetylene in a mixture containing acetylene and ethylene, which comprises intermixing the mixture with from 50 to 2000 parts by volume of a substituted cyclohexane selected from the group consisting of Decalin, dimethylcyclohexane, diethylcyclohexane, and methylethylcyclohexane per million parts of the mixture and with hydrogen in a proportion greater than 1 mole of hydrogen per mole of acetylene in the mixture, passing the resulting mixture in contact with a catalytic body containing an effective proportion of a composite metal material wherein are from 60 to 99 parts by weight of palladium and from 40 to 1 by weight of silver.

4. A process according to claim 3 wherein the substituted cyclohexane compound is diethylcyclohexane.

5. A process according to claim 4 wherein the acetylene and ethylene is intermixed with from 100 to 500 parts by volume of diethylcyclohexane per million parts of the mixture.

6. A process according to claim 3 wherein the substituted cyclohexane compound is Decalin.

7. A process according to claim 6 wherein the acetylene and ethylene is intermixed with from 100 to 500 parts by volume of Decalin per million parts of the mixture.

References Cited in the file of this patent

UNITED STATES PATENTS 2,802,889     Frevel et al.     Aug. 13, 1957